US012604914B2

(12) United States Patent
Marshall et al.

(10) Patent No.: US 12,604,914 B2
(45) Date of Patent: Apr. 21, 2026

(54) DEMINERALISED LACTOSE CONCENTRATE

(71) Applicant: N.V. Nutricia, Zoetermeer (NL)

(72) Inventors: Cameron Marshall, Utrecht (NL); Tuan Nguyen, Utrecht (NL); Ana Ospina Martinez, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 459 days.

(21) Appl. No.: 18/259,286

(22) PCT Filed: Dec. 31, 2021

(86) PCT No.: PCT/EP2021/087902
§ 371 (c)(1),
(2) Date: Jun. 26, 2023

(87) PCT Pub. No.: WO2022/144447
PCT Pub. Date: Jul. 7, 2022

(65) Prior Publication Data
US 2024/0057626 A1     Feb. 22, 2024

(30) Foreign Application Priority Data

Jan. 4, 2021     (EP) ..................................... 21150059

(51) Int. Cl.
A23C 9/144          (2006.01)
A23C 9/142          (2006.01)
(Continued)

(52) U.S. Cl.
CPC ............ A23C 9/144 (2013.01); A23C 9/1422 (2013.01); A23L 33/125 (2016.08); A23L 33/40 (2016.08);
(Continued)

(58) Field of Classification Search
CPC ............ A23C 9/1422; A23C 2210/202; A23C 2210/206; A23C 7/04; A23C 9/14–144;
(Continued)

(56) References Cited

U.S. PATENT DOCUMENTS 4,497,836 A * 2/1985 Marquardt ........... A23C 9/1425
                                                        426/583
5,980,961 A * 11/1999 Berrocal ................ A23C 9/144
                                                        204/632
(Continued)

FOREIGN PATENT DOCUMENTS

AU          2020277271 A1 * 12/2020 ........... A23C 9/1425
EP          1031288 A1 * 8/2000 ............. A23L 33/16
(Continued)

OTHER PUBLICATIONS

Translation of Cn 111205339A (Year: 2020).*
(Continued)

*Primary Examiner* — Drew E Becker
(74) *Attorney, Agent, or Firm* — Ipsilon USA—NLO

(57)                    ABSTRACT

The present invention provides a process of producing a lactose concentrate, said process comprising the step of subjecting a partially demineralised aqueous lactose isolate to electrodialysis to produce a biotin-reduced lactose isolate containing at least 90% lactose by weight of dry matter and less than 2 mg ash per gram of lactose, and containing:
  0.02-1.5 mg sodium per gram of lactose;
  0.02-2 mg potassium per gram of lactose;
  0.05-1.5 mg chloride per gram of lactose;
  0.01-0.25 µg biotin per gram of lactose.
The present invention also relates to a demineralised lactose concentrate having a reduced biotin content that can be produced by the aforementioned process. The invention
(Continued)

Figure 1:
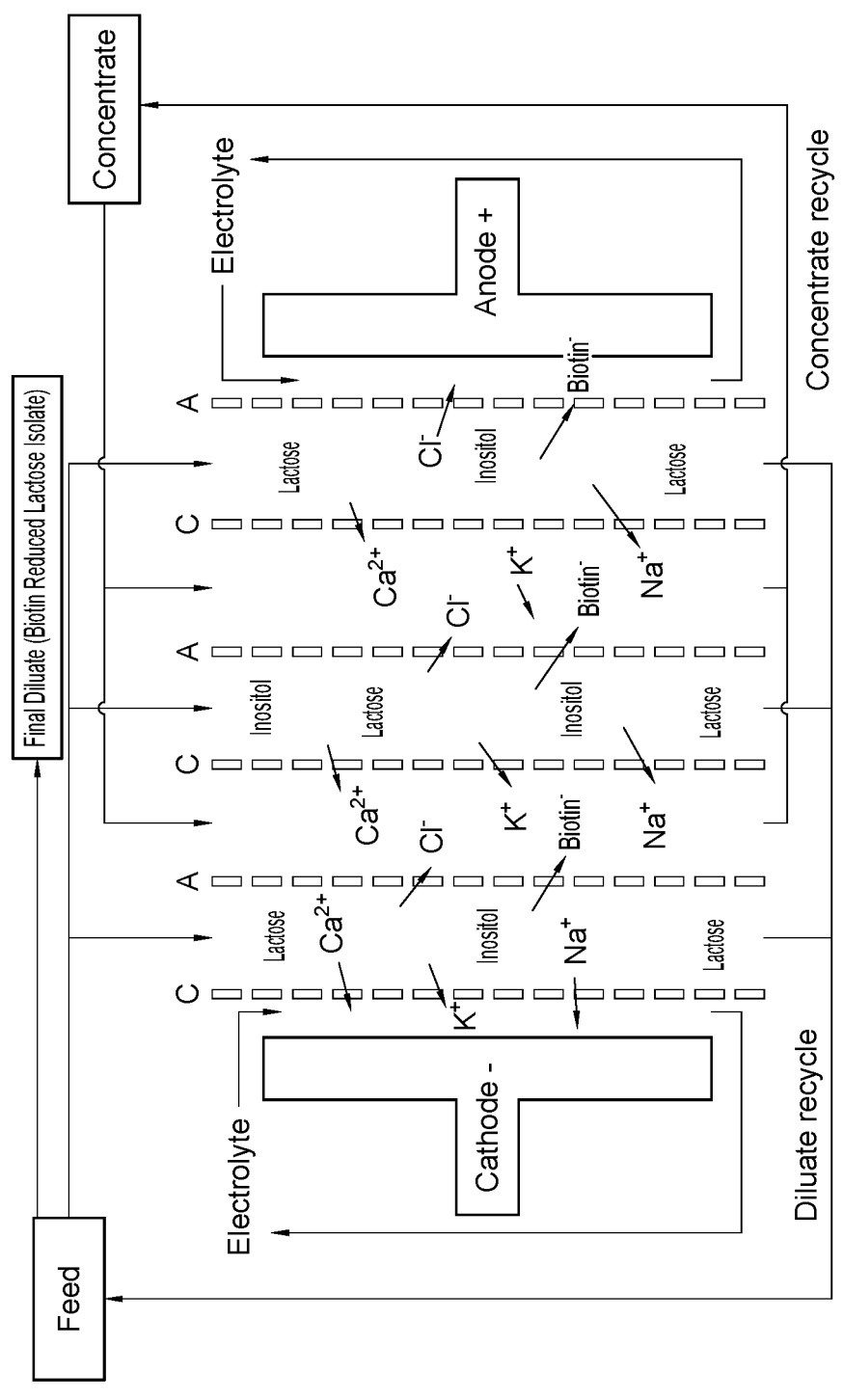

further relates to an oligosaccharide-enriched biotin-reduced fraction that is obtained when lactose is separated before or after the electrodialysis step.

11 Claims, 2 Drawing Sheets

(51) Int. Cl.

| | |
|---|---|
| *A23L 33/00* | (2016.01) |
| *A23L 33/125* | (2016.01) |
| *B01D 61/02* | (2006.01) |
| *B01D 61/14* | (2006.01) |
| *B01D 61/42* | (2006.01) |
| *B01D 61/58* | (2006.01) |
| *B01D 69/02* | (2006.01) |
| *C13K 5/00* | (2006.01) |

(52) U.S. Cl.
CPC ......... *B01D 61/027* (2013.01); *B01D 61/145* (2013.01); *B01D 61/422* (2013.01); *B01D 61/58* (2013.01); *B01D 69/02* (2013.01); *C13K 5/00* (2013.01); *A23C 2210/202* (2013.01); *A23C 2210/206* (2013.01); *B01D 2311/06* (2013.01); *B01D 2311/08* (2013.01); *B01D 2325/20* (2013.01)

(58) Field of Classification Search
CPC .......... A23L 33/125; A23L 33/40; A23L 5/20; A23L 5/51; A23L 33/20; B01D 61/027; B01D 61/145; B01D 61/422; B01D 61/58; B01D 69/02; B01D 2311/06; B01D 2311/08; B01D 2325/20; C13K 5/00
See application file for complete search history.

(56) References Cited

U.S. PATENT DOCUMENTS

| | | | | |
|---|---|---|---|---|
| 8,840,947 | B2 * | 9/2014 | Scott | A23C 9/146 |
| | | | | 426/74 |
| 11,109,605 | B2 * | 9/2021 | David | A23C 19/05 |
| 11,116,233 | B2 * | 9/2021 | David | A23C 9/1307 |
| 12,161,132 | B2 * | 12/2024 | Holst | A23C 9/1422 |
| 2004/0033573 | A1 * | 2/2004 | Norddahl | C12P 7/56 |
| | | | | 435/139 |
| 2009/0142459 | A1 | 6/2009 | Batchelder | |
| 2012/0121781 | A1 | 5/2012 | Scott et al. | |
| 2013/0123489 | A1 * | 5/2013 | Neumann | A23C 9/1522 |
| | | | | 426/244 |
| 2014/0302219 | A1 * | 10/2014 | Tikanmaki | A23L 33/40 |
| | | | | 426/491 |
| 2016/0040258 | A1 * | 2/2016 | Stephenson | A23C 9/1425 |
| | | | | 127/55 |
| 2016/0278421 | A1 | 9/2016 | Berrocal et al. | |
| 2018/0296980 | A1 | 10/2018 | Choudhary | |
| 2023/0255224 | A1 * | 8/2023 | Ur | A23C 9/1206 |
| | | | | 426/491 |
| 2025/0234878 | A1 * | 7/2025 | Rauh | A23C 9/144 |

FOREIGN PATENT DOCUMENTS

| | | | | | |
|---|---|---|---|---|---|
| EP | 2408311 | B1 * | 5/2013 | | A23C 9/1425 |
| EP | 3669671 | A1 | 6/2020 | | |
| WO | WO-0192555 | A1 * | 12/2001 | | B01D 61/423 |
| WO | 2006/087391 | A1 | 8/2006 | | |
| WO | 2017220697 | A1 | 12/2017 | | |

OTHER PUBLICATIONS

Translation of Fr 2809595A1 (Year: 2001).*
Translation of Ep 3915400A1 (Year: 2021).*
Merkel Arthur et al, "An Investigation on the Application of Pulsed Electrodialysis Reversal in Whey Desalination", International Journal of Molecular Sciences, vol. 20, No. 8, Apr. 18, 2019 (Apr. 18, 2019), p. 1918, XP055814523, DOI: 10.3390/ijms20081918.
The Commission of the European Communities: "Commission directive 2006/141/EC of Dec. 22, 2006 on infant formulae and follow-on formulae and amending Directive 1999/21/EC", Official Journal of the European Union, Dec. 30, 2006 (Dec. 30, 2006), pp. L401/1-L 401/33, XP055350783, Retrieved from the Internet: URL:http://eur-lex.europa.eu/legal-content/EN/TXT/PDF/?uri=CELEX:32006L0141&qid=1488383936069&from=en [retrieved on Mar. 1, 2017].
Gavazzi-April C et al: "Preparation of milk protein concentrates by ultrafiltration and continuous diafiltration: Effect of process design on overall efficiency", Journal of Dairy Science, American Dairy Science Association, US, vol. 101, No. 11, Aug. 30, 2018 (Aug. 30, 2018), pp. 9670-9679, XP085509981, ISSN: 0022-0302, DOI:10.3168/JDS.2018-14430.
Anonymous: "Whey powder, acid | Tables of composition and nutritional values of feed materials", Oct. 31, 2020(Oct. 31, 2020), pp. 1-12, XP055897543, WWW.feedtables.com/ Retrieved from the Internet: URL:http://web.archive.org/web/20201031095855/https://feedtables.com/content/whey-powder-acid [retrieved on Mar. 3, 2022].
Hahn James et al: "Fact Sheet—Milk Protein Testing—FAQ's Changing from Crude Protein to True Protein", Reporter—Chicago Regional Marketing Area, Indiana Marketing Areas, vol. 32, No. 6, Jun. 1, 1999 (Jun. 1, 1999), pp. 1-2, XP055897049, Retrieved from the Internet: URL:WWW.google.de/books/edition/Reporter/yV9EAAAAYAAJ?hl=en&gbpv=0>.
Frieslandcampina, Product Data Sheet: "A high quality demineralised whey concentrate with a consistent and low mineral content prepared from fresh whey", Deminal® 90 Liquid.

* cited by examiner

DEMINERALISED LACTOSE CONCENTRATE

TECHNICAL FIELD OF THE INVENTION

The invention relates to process of producing a demineralised lactose concentrate and/or an oligosaccharide enriched fraction, said process comprising the step of subjecting a partially demineralised aqueous lactose isolate to a electrodialysis step.

Also provided are a demineralised lactose concentrate and a method of preparing an edible product or a pharmaceutical product, said method comprising combining the demineralised lactose concentrate with one or more other edible ingredients.

The demineralised lactose concentrate of the present invention is particularly suitable for use in infant formula.

BACKGROUND OF THE INVENTION

Infant formula is a manufactured food designed and marketed for feeding to babies and infants under 12 months of age, usually prepared for bottle-feeding or cup-feeding from powder (mixed with water) or liquid (with or without additional water).

The composition of infant formula is designed to resemble the composition of human mother's milk at approximately one to three months postpartum. The most commonly used infant formulas contain purified cow's milk whey and casein as a protein source, a blend of vegetable oils as a fat source, lactose as a carbohydrate source, a vitamin-mineral mix, and other ingredients depending on the manufacturer.

Although cow's milk is the basis of almost all infant formula, plain cow's milk is unsuited for infants because of its high casein content and low whey content. The infant intestine is not properly equipped to digest non-human milk, and this may often result in diarrhea, intestinal bleeding and malnutrition. To reduce the negative effect on the infant's digestive system, cow's milk used for formula undergoes processing to be made into infant formula. This includes steps to make protein more easily digestible and alter the whey-to-casein protein balance to one closer to human milk, the addition of several essential ingredients (often called "fortification", see below), the partial or total replacement of dairy fat with fats of vegetable or marine origin, etc.

Carbohydrates are an important source of energy for growing infants, as they account for 35 to 42% of their daily energy intake. In most cow's milk-based formulas, lactose is the main source of carbohydrates present. Lactose is not only a good source of energy, it also aids in the absorption of the minerals magnesium, calcium, zinc and iron.

Infant formulae have to meet compositional requirements that are laid down in regulations such as the European Commission Directive 91/321/EEC 2006/141/EC of 22 Dec. 2006 on infant formulae and follow-on formulae. According to the latter directive infant formulae when reconstituted as instructed by the manufacturer should meet, amongst other things, the following composition requirements (when manufactured from cow's milk proteins:

| | |
|---|---|
| Energy | 250-295 kJ/100 ml |
| Protein | 0.45-0.7 g per 100 kJ |
| Lipids | 1.05-1.4 g per 100 kJ |
| Carbohydrates | 2.2-3.4 g per100 kJ |
| Choline | 1.7-12 mg per100 kJ |

-continued

| | |
|---|---|
| Inositol | 1-10 mg per 100 kJ |
| L-carnitine | ≥0.3 mg per 100 kJ |
| Riboflavin | 19-95 µg per 100 kJ |
| Pantothenic acid | 95-475 µg per 100 kJ |
| Biotin | 0.4-1.8 µg per 100 kJ |
| Sodium | 5-14 mg per 100 kJ |
| Potassium | 15-38 mg per 100 kJ |
| Calcium | 12-33 mg per 100 kJ |

In order to meet this stringent requirements manufacturers of infant formulae prefer to employ sources of proteins, lipids and carbohydrates that are highly purified, i.e. that have a low mineral content and a low content of e.g. biotin.

The concentration levels of minerals and biotin in cow's milk are quite high and these components are concentrated together with lactose by the membrane filtration step(s) that are commonly used to prepare lactose concentrates from skim milk or whey. It is known to produce a demineralised whey concentrate with high lactose content by subjecting sweet whey to nanofiltration (NF), followed by partial demineralisation of the NF-permeate by means of electrodialysis and further demineralisation by passing the partially demineralised filtrate through a column filled with ion exchange resin.

Demineralised whey concentrates having a high lactose content that are particularly suited for use in infant formula are commercially available. Deminal® 90 Liquid (ex FrieslandCampina Ingredients) is an example of such a demineralised whey concentrate. It is sold in liquid and powder form. The liquid product has a dry matter content of 29 wt. %, contains 13.5% protein (Nx6.38) and 84.5% lactose, calculated by weight of dry matter. Biotin content of the product is 4 µg per 100 grams of dry matter.

US 2009/0142459 describes a process for demineralizing whey comprising:
a) softening the whey by use of cationic ion exchange; and
b) subjecting the product of step a to bipolar membrane electrodialysis.

US 2012/0121781 describes a process for the demineralisation and fractionation of whey or raw milk comprising the steps of:
a) subjecting the whey or raw milk to ultrafiltration to provide a retentate fraction and a whey permeate;
b) concentrating the whey permeate to nanofiltration to provide a concentrated lactose rich retentate;
c) subjecting the nanofiltration retentate to ion permeation chromatography at elevated temperatures of between 50° C. and 80° C.; and
d) eluting the nanofiltration retentate in various fractions from the resin using water as the eluant.

US 2018/0296980 describes a method for demineralization of a solution that comprises at least one biomolecule and at least one ion, comprising: applying a voltage to a first electrochemical cell that comprises:
(a) a first housing comprising an inlet and an outlet;
(b) first and second electrodes:
(c) at least one first water-splitting ion exchange membrane between the first and second electrodes, wherein the water-splitting membrane comprises: (i) a cation exchange layer facing the first electrode and comprising a bound cation; and (ii) an anion exchange layer facing the second electrode and comprising a bound anion;
(d) a solution that comprises at least one biomolecule and at least one ion, wherein the solution flows through a continuous channel from the inlet to the outlet of the cell and contacts the first and second electrodes and the cation and anion exchange layers of the water-splitting membrane, wherein at least one ion binds to the cation exchange layer or the anion exchange layer on the first water splitting membrane, thereby causing demineralization of the solution by removing or reducing the concentration of at least one ion. The solution that comprises at least one biomolecule and at least one ion can be a permeate of whey filtration, and a lactose powder may be prepared from the solution that flows through the electrochemical cell as a demineralized solution.

WO 2006/087391 describes a process for producing an oligosaccharide mixture derived from animal milk and having the same spectrum of oligosaccharides as the milk from which it was derived comprising the following steps:

(a) concentrating a deproteinised milk material to 50 to 75% total solids;

(b) subjecting the concentrated milk material to a lactose removal step to produce a liquor having a lactose: oligosaccharide ratio of less than 250; and (c) demineralising the milk material, the demineralisation step being carried out either before the concentration step of after the lactose removal step.

US 2016/0278421 describes an oligosaccharide mixture derived from cow's milk, the oligosaccharide mixture comprising:

a soluble oligosaccharide population comprising a soluble oligosaccharide fraction found in cow's milk; and beta-galactooligosaccharides formed by the action of beta-galactosidase on lactose present in cow's milk oligosacccharides, and the mixture having a total monosaccharide content of less than 5% w/v and a lactose:total oligosaccharide ratio of less than 10, wherein a nanofiltration step is performed after the action of beta-galactosidase.

Merkel et al. (*An Investigation on the Application of Pulsed Electrodialysis Reversal in Whey Desalination*, Int.]. Mol. Sci. (2019), 20, 1918) describes a study in which three regimes of Pulsed Electrodialysis Reversal (PER) were applied in the desalination of acid whey (pH<5) to study their effects on membrane fouling and ED efficiency.

SUMMARY OF THE INVENTION

The inventors have designed a novel process that enables the preparation of a highly demineralised lactose concentrate having a reduced biotin content. The inventors have found that minerals and biotin can be removed very effectively from a partially demineralised aqueous lactose solution by subjecting the solution to electrodialysis.

Accordingly, the present provides a process of producing a lactose concentrate, said process comprising:

providing a partially demineralised aqueous lactose isolate having a lactose content of 5-40 wt. %, a water content of at least 40 wt. %, a whey protein content that does not exceed 3% by weight of dry matter and/or a lactose content of at least 90% by weight of dry matter, and an ash content of at least 10 mg ash per gram of lactose, wherein the lactose and water together constitute at least 80 wt. % of the isolate, said isolate containing:

1-30 mg sodium per gram of lactose;

5-50 mg potassium per gram of lactose;

1-40 mg chloride per gram of lactose;

0.15-3 µg biotin per gram of lactose;

subjecting the partially demineralised aqueous lactose isolate to an electrodialysis step to produce a biotin-reduced lactose isolate containing at least 90% lactose by weight of dry matter and less than 2 mg ash per gram of lactose, and containing:

0.02-1.5 mg sodium per gram of lactose;

0.02-2 mg potassium per gram of lactose;

0.05-1.5 mg chloride per gram of lactose;

0.01-0.25 µg biotin per gram of lactose.

The above process of the invention is effectively a process to reduce the biotin content in a lactose isolate.

Due to the effective removal of biotin in the electrodialysis (ED) step of the present process, treatment with ion exchange resin is unnecessary. An important drawback of the use of ion exchange resins lies in the fact that the ion exchange resin must be regenerated once it has been saturated by ion adsorption.

The present invention also relates to a demineralised lactose concentrate having a reduced biotin content that can be produced by the aforementioned process. This demineralised lactose concentrate has an ash content of less than 2 mg ash per gram of lactose and comprises:

900-995 mg lactose per gram of dry matter;

0.02-0.5 mg sodium per gram of lactose;

0.02-2 mg potassium per gram of lactose;

0.02-2 mg calcium per gram of lactose;

0.01-0.15 µg biotin per gram of lactose;

0.1-2 mg inositol per gram of lactose;

0.1-2 mg L-carnitine per gram of lactose;

0.01-0.2 mg riboflavin per gram of lactose;

wherein the combined concentration of sodium, potassium, calcium and magnesium is less than 2 mmol per 100 grams of dry matter.

The invention further relates to an oligosaccharide-enriched biotin-reduced fraction that is obtained when lactose is separated before or after the electrodialysis step. This oligosaccharide-enriched biotin-reduced fraction comprises:

300-900 mg lactose per gram of dry matter;

1-30 mg ash per gram of dry matter;

0.5-75 mg oligosaccharides per gram of dry matter;

5-100 µg biotin per gram of oligosaccharides.

Also provided is a method of preparing an edible product or a pharmaceutical product, the method comprising combining the aforementioned demineralised lactose concentrate or oligosaccharide-enriched lactose fraction with one or more other edible ingredients

FIGURES

FIG. 1 schematically depicts the ion separation that occurs within an electrodialysis cell in the process according to the present invention.

Figure 2:
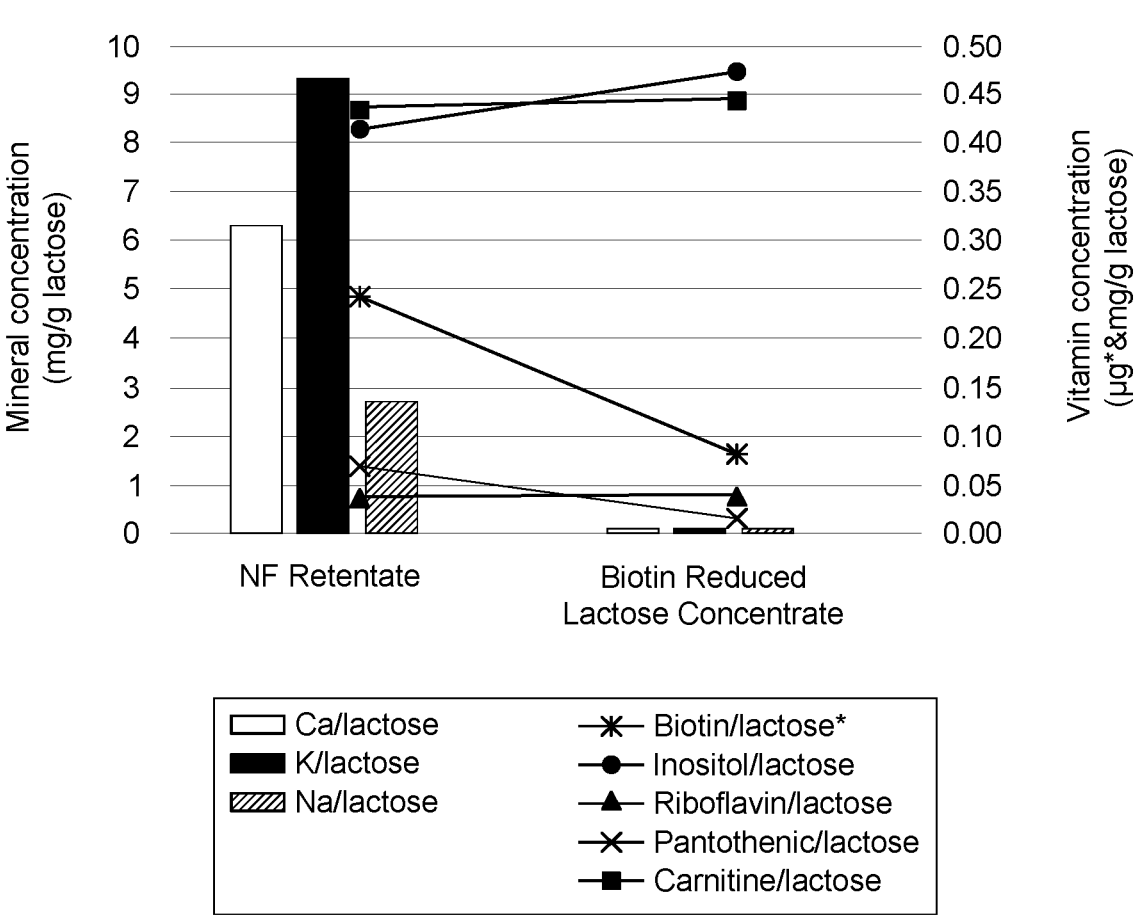

FIG. 2 graphically shows the effect of the electrodialysis step of the present process on the concentration levels of a number of micronutrients.

DETAILED DESCRIPTION OF THE INVENTION

A first aspect of the present invention relates to a process of producing a lactose concentrate, said process comprising:

providing a partially demineralised aqueous lactose isolate having a lactose content of 5-40 wt. %, a water content of at least 40 wt. %, a whey protein content that does not exceed 3% by weight of dry matter and/or a lactose content of at least 90% by weight of dry matter, and an ash content of at least 10 mg ash per gram of lactose, wherein the lactose and water together constitute at least 80 wt. % of the isolate, said isolate containing:
1-30 mg sodium per gram of lactose;
5-50 mg potassium per gram of lactose;
1-40 mg chloride per gram of lactose;
0.15-3 µg biotin per gram of lactose;
subjecting the partially demineralised aqueous lactose isolate to an electrodialysis step to produce a biotin-reduced lactose isolate containing at least 90% lactose by weight of dry matter and less than 2 mg ash per gram of lactose, and containing:
0.02-1.5 mg sodium per gram of lactose;
0.02-2 mg potassium per gram of lactose;
0.05-1.5 mg chloride per gram of lactose;
0.01-0.25 µg biotin per gram of lactose.

The term "ash" as used herein refers to the inorganic residue remaining after either ignition or complete oxidation of organic matter in a sample. The inorganic residue consists mainly of the minerals.

The term "oligosaccharide" as used herein refers to a saccharide oligomer containing 3-10 monosaccharide units.

The term "biotin" as used herein refers to a water-soluble B-vitamin with the following IUPAC name: 5-[(3aS,4S,6aR)-2-oxohexahydro-1H-thieno[3,4-d]imidazol-4-yl]pentanoic acid (CAS Number 58-85-5).

The term "dairy" as used herein means derived from cow's milk, goat's milk, sheep's milk, horse's milk and buffalo's milk.

The term "electrodialysis" as used herein refers to an electrochemical process in which ions are transported, under the influence of an electric potential, from a starting solution (diluate) through semi permeable membranes into a more concentrated solution (concentrate). In order to separate salts from a solution, ion-selective membranes, through which only one type of ion can permeate, are arranged in the solution perpendicular to the electric field. Thus anions can pass through an anion exchange (or anion permeable) membrane on their way to the anode but are selectively retained by the upstream cation exchange membrane. Likewise, cations can pass through an cation exchange (or cation permeable) membrane on their way to the cathode but are selectively retained by the upstream anion exchange membrane. This results in a concentration of electrolytes in the so-called concentrate and a depletion of charge carriers in the so-called diluate. A typical electrodialysis system has up to 100 or more unit cells (cell pairs) in a plate-and-frame arrangement where the cation and anion exchange membranes are placed in an alternating pattern between the anode and cathode electrodes of a direct current source.

The term "bipolar membrane electrodialysis" as used herein refers a method that combines electrodialysis for ion separation with electrodialysis water splitting for the conversion of a salt into its corresponding acid and base. The bipolar membranes enhance the splitting of water into protons and hydroxide ions. Bipolar membranes are a special type of layered ion exchange membrane where the two polymer layers one is only permeable for the anions and the other only for cations. Due to the absence of electrode reactions no oxidation-reduction reactions occur during bipolar membrane electrodialysis and formation of oxidation and/or reduction by products is avoided.

A schematic representation of the ion separation that occurs within an electrodialysis cell in the process of the present invention is shown in FIG. 1.

In an electrodialysis cell it is possible to combine anion exchange (A), cation exchange (C) and bipolar membranes (B) in different setups, simply alternating ACAC as above, or ABAB . . . or BCBC . . . but also setups like AACAAC . . . , or ACCACC . . . are possible.

The term "infant formula" as used herein refers to a foodstuff intended for particular nutritional use by infants during the first 12 months of life. The term "infant formula" encompasses both "starter infant formula" and "follow-up formula" or "follow-on formula". Preferably, the infant food meets the of the European Commission Directive 91/321/EEC 2006/141/EC of 22 Dec. 2006 on infant formulae and follow-on formulae.

As used herein, the terms "comprises," "comprising," "includes," "including," "has," "having" or any other variation thereof, are intended to cover a non-exclusive inclusion. For example, a process, method, product or apparatus that comprises a list of elements is not necessarily limited to only those elements, but may include other elements not expressly listed or inherent to such process, method, product or apparatus.

The electrodialysis (ED) step of the present process is preferably carried out using a voltage in the range of 30 to 200 V, more preferably in the range of 30 to 100 V and most preferably of 30 to 50 V. Here the voltage refers to the voltage that is applied across the ion selective membranes while the partially demineralised aqueous lactose isolate flows past these membranes.

According to a particularly preferred embodiment, the total electrical energy input during the ED step equals 20-200 Joule per gram of lactose, more preferably 30-180 Joule per gram of lactose, most preferably 35-160 Joule per gram of lactose.

In the present process electrodialysis is used to remove the bulk of the minerals contained in the partially demineralised aqueous lactose isolate. Preferably, at least 90 mol %, more preferably at least 95 mol % and most preferably at least 97 mol % of minerals selected from sodium, potassium, calcium and magnesium are removed by the electrodialysis step.

Typically, the biotin-reduced lactose isolate that is obtained by the present process contains the minerals sodium, potassium, calcium and magnesium in a combined concentration of is less than 2 mmol per 100 grams of dry matter, more preferably of less than 1.5 mmol per 100 grams of dry matter and most preferably of less than 1.2 mmol per 100 grams of dry matter.

The ED step is preferably carried out a temperature of 4-65° C., more preferably a temperature of 8-20° C. and most preferably a temperature of 8-15° C.

According to an embodiment of the present process, the partially demineralised aqueous lactose isolate is subjected to bipolar membrane electrodialysis.

Pressure employed during the electrodialysis is preferably in the range of 0.5-3 bar.

The partially demineralised aqueous lactose isolate that is processed in accordance with the present process preferably is dairy derived. Most preferably it is derived from cow's milk.

According to a particularly preferred embodiment, all of the protein, carbohydrates and fat contained in the partially demineralised aqueous lactose isolate is dairy derived, most preferably these components are derived from cow's milk.

The partially demineralised lactose concentrate preferably contains less than 1% by weight of dry matter, more preferably less than 0.8% by weight of dry matter and most preferably less than 0.5% by weight of dry matter of substances having a molecular weight in excess of 400 Da.

The conductivity of the partially demineralised aqueous lactose isolate that is subjected to the ED step preferably is at least 5 mS/cm, more preferably at least 7 mS/cm and most preferably at least 9 mS/cm.

The dry matter content of the partially demineralised aqueous lactose isolate is preferably in the range of 5-65 wt. %, more preferably in the range of 10-30 wt. % and most preferably in the range of 15-25 wt. %.

Preferably, the partially demineralised aqueous lactose isolate contains less than 3%, more preferably less than 2% and most preferably less than 1% protein by weight of dry matter.

The casein content of the partially demineralised aqueous lactose isolate preferably does not exceed 3%, more preferably does not exceed 2% and most preferably less than 1% by weight of dry matter.

The whey protein content of the partially demineralised aqueous lactose isolate preferably does not exceed 3%, more preferably does not exceed 2% and most preferably is less than 1% by weight of dry matter.

The fat content of the partially demineralised aqueous lactose isolate is preferably less than 3%, more preferably less than 2%, most preferably less than 1% by weight of dry matter.

The lactose content of the partially demineralised aqueous lactose isolate is preferably in the range of 85-96%, more preferably in the range of 9096%, even more preferably in the range of 93-96%, most preferably in the range of 95-96% by weight of dry matter.

The lactate content of the partially demineralised aqueous lactose isolate preferably does not exceed 5%, more preferably does not exceed 3%, and most preferably does not exceed 2% by weight of dry matter.

The pH of the partially demineralised aqueous lactose isolate is preferably in the range of 5.5 to 7.5, most preferably in the range of 6.0 to 7.0.

The partially demineralised aqueous lactose isolate that is subjected to the ED step preferably has a lactose content of 5-60 wt. %, more preferably of 15-25 wt. %.

The water content of the partially demineralised aqueous lactose isolate preferably is at least 35 wt. %, more preferably at least 75 wt. %.

Lactose and water together preferably constitute at least 90 wt. %, more preferably at least 97 wt. % of the partially demineralised aqueous lactose isolate.

In accordance with a particularly preferred embodiment, the partially demineralised aqueous lactose isolate contains at least 20 mg ash per gram of lactose, more preferably at least 25 mg ash per gram of lactose.

In one embodiment of the present invention, calcium phosphate is removed from the partially demineralised aqueous lactose isolate prior to the electrodialysis step. The partially demineralised aqueous lactose isolate so obtained preferably contains 0.2-4 mg calcium per gram of lactose, more preferably 0.4-1.0 mg calcium per gram of lactose.

In another embodiment, no calcium phosphate is removed. In accordance with this embodiment, the partially demineralised aqueous lactose isolate preferably contains 0.5-30 mg calcium per gram of lactose, more preferably 1-20 mg calcium per gram of lactose.

The partially demineralised aqueous lactose isolate preferably contains 1.5-10 mg sodium per gram of lactose, more preferably 1.8-6 mg sodium per gram of lactose.

Potassium is preferably contained in the partially demineralised aqueous lactose isolate in concentration of 6-25 mg potassium per gram of lactose, more preferably in a concentration of 7-20 mg potassium per gram of lactose.

The chloride content of the partially demineralised aqueous lactose isolate preferably lies in the range of 1.5-10 mg chloride per gram of lactose, more preferably in the range of 1.8-6 mg chloride per gram of lactose.

Biotin is preferably contained in the partially demineralised aqueous lactose isolate in a concentration of 0.18-3.0 µg biotin per gram of lactose, more preferably in a concentration of 0.20-1.0 µg biotin per gram of lactose.

In a preferred embodiment, the present process comprises preparing the partially demineralized aqueous lactose isolate by:

subjecting an optionally microfiltered dairy liquid to an ultrafiltration step to produce a ultrafiltration permeate, said dairy liquid being selected from skim milk, whey, whole milk and combinations thereof;

subjecting the ultrafiltration permeate to a nanofiltration or reverse osmosis step to produce a nanofiltration or reverse osmosis retentate; and optionally subjecting the nanofiltration or reverse osmosis retentate to a softening step, said softening step comprising adding a sequestering agent to the nanofiltration or reverse osmosis retentate, said sequestering agent being selected from phosphates, polyphosphates, phosphonates, polycarboxylates and combinations thereof.

The dairy liquid that is subjected to ultrafiltration in the present process preferably is derived from cow's milk.

According to a particularly preferred embodiment, the dairy liquid that is subjected to the ultrafiltration step is skim milk or microfiltered skim milk. Microfiltration can suitably be used to remove casein. The microfiltered skim milk preferably has been obtained by microfiltration using a membrane having a pore size of 0.05-0.3 µm, more preferably a pore size of 0.1-0.2 µm.

The ultrafiltration step used to produce the ultrafiltration permeate preferably employs an ultrafiltration membrane having a cut-off in the range of 3-100 kDa, more preferably in the range of 5-20 kDa.

In the present process the ultrafiltration permeate is preferably subjected to a nanofiltration or reverse osmosis step using a filtration membrane having rejection of at least 50%, more preferably at least 70% and mot preferably of at least 80% on 2,000 ppm $MgSO_4$ at 25° C. (77° F.) and 110 psi operating pressure.

The filtration membrane used in the nanofiltration or reverse osmosis step preferably has a cut-off in the range of 20-3000 Da, more preferably in the range of 500-2000 Da and most preferably in the range of 800-1000 Da.

According to an embodiment of the present invention, the nanofiltration or reverse osmosis retentate is softened by the addition of a sequestering agent prior to the ED step.

In accordance with another embodiment of the present invention, the process comprises the step of removing calcium phosphate from the retentate of nanofiltration or reverse osmosis prior to the electrodialysis step. Calcium phosphate may be removed from the aforementioned retentate by precipitating the calcium phosphate, followed by a solid-liquid separation (e.g. filtration or centrifugation). Precipitation of calcium phosphate can suitably be induced by ensuring that the pH of retentate is in the range of 5.5 to 9.0, more preferably in the range of 6.5 to 8.5 while it is heated to above 60° C. for more than 30 minutes, more preferably above 70° C. for over 60 minutes and most preferably above 80° C. for over 90 minutes.

The conductivity of the biotin-reduced lactose isolate that is produced by the ED step is preferably below 1 mS/cm, more preferably below 0.5 mS/cm and most preferably below 0.3 mS/cm.

The biotin-reduced lactose isolate that is produced by the ED step preferably contains 93-99.5% lactose by weight of dry matter, more preferably 95-99.0% lactose by weight of dry matter.

The sodium content of the biotin-reduced lactose isolate preferably lies in the range of 0.02-1.5 mg sodium per gram of lactose, more preferably in the range of 0.03-0.7 mg sodium per gram of lactose, most preferably in the range of 0.05-0.30 mg sodium per gram of lactose.

The potassium content of the biotin-reduced lactose isolate preferably lies in the range of 0.02-2 potassium per gram of lactose, more preferably in the range of 0.03-0.5 mg potassium per gram of lactose, most preferably in the range of 0.04-0.30 mg potassium per gram of lactose.

Chloride is preferably contained in the biotin-reduced lactose isolate in a concentration of 0.05-1.5 mg chloride per gram of lactose, more preferably in a concentration of 0.2-1.2 mg chloride per gram of lactose.

The biotin content of the biotin-reduced lactose isolate preferably is in the range of 0.01-0.25 µg biotin per gram of lactose, more preferably in the range of 0.02-0.15 µg biotin per gram of lactose, most preferably in the range of 0.03-0.10 µg biotin per gram of lactose.

According to a particularly preferred embodiment, the biotin-reduced lactose isolate contains, per gram of lactose, less than 1 mg sodium, less than 1 mg potassium and less than 1.5 mg chloride.

The biotin content of the biotin-reduced lactose isolate, calculated by weight of lactose, is preferably at least 50% lower, more preferably at least 60% lower, even more preferably 65-90% lower than the biotin content of the partially demineralised lactose isolate, calculated by weight of lactose.

Preferably, the conductivity of the biotin-reduced lactose isolate that is produced by the ED step is at least 5 times, more preferably at least 8 times and most preferably at least 12 time lower than the conductivity of the partially demineralised aqueous lactose isolate that was subjected to the ED step to produce said biotin-reduced lactose isolate.

According to a particularly preferred embodiment, the biotin-reduced lactose isolate produced by the present process is a demineralised lactose concentrate as described hereinafter.

Besides lactose and micronutrients, the partially demineralised aqueous lactose isolate as well as the biotin reduced lactose isolate typically contains a significant amount of milk oligosaccharides.

Milk oligosaccharides are indigestible for the newborn child. However, they have a prebiotic effect and serve as food for intestinal bacteria, especially bifidobacteria. The dominance of these intestinal bacteria in the gut reduces the colonization with pathogenic bacteria (probiosis) and thereby ensures a healthy intestinal flora (intestinal microbiome) and a reduced risk of dangerous intestinal infections.

While human milk has a oligosaccharide concentration range of 5-15 g/L, bovine milk is significantly lower with mature milk close to 0.1 g/L with a typical corresponding lactose concentration of 48 g/L. The oligosaccharide-enriched biotin-reduced fraction obtained by the present process may advantageously be added to e.g. infant formula.

As mentioned herein before, the present process may suitably contain one or more steps to separate lactose before or after the ED step. Preferably, lactose is separated by one or more crystallisation steps. Separation of lactose before or after the ED-step enables the production of an oligosaccharide-enriched and biotin-reduced fraction. This oligosaccharide-enriched and biotin-reduced fraction is either obtained by separating lactose from the biotin-reduced lactose isolate or by separating lactose from the partially demineralised aqueous lactose isolate, followed by the ED step.

Accordingly, in one embodiment of the present invention, prior to the ED step, lactose is separated from the partially demineralised aqueous lactose isolate, preferably in one or more crystallisation steps. Separation of lactose prior to ED step offers the advantage that the mineral and biotin content of the oligosaccharide biotin-reduced fraction can be minimised very effectively. Preferably this embodiment of the process yields an oligosaccharide-enriched biotin-reduced fraction as specified below.

In an alternative embodiment, lactose is separated from the biotin-reduced lactose isolate, preferably by subjecting the biotin-reduced lactose isolate to one or more crystallisation steps to produce crystallised lactose and an oligosaccharide-enriched biotin-reduced fraction. Separation of lactose after the ED step offers the advantage that due to the low mineral content, a sequence of multiple crystallisation steps can be employed to produce an oligosaccharide-enriched biotin-reduced fraction having a high oligosaccharide content.

Preferably this embodiment of the process yields an oligosaccharide-enriched biotin-reduced fraction as specified below.

Another aspect of the invention relates to a demineralised lactose concentrate having a reduced biotin content and containing less than 2 mg ash per gram of lactose, said concentrate comprising:

900-995 mg lactose per gram of dry matter;
0.02-0.5 mg sodium per gram of lactose;
0.02-2 mg potassium per gram of lactose;
0.02-2 mg calcium per gram of lactose;
0.01-0.15 µg biotin per gram of lactose;
0.1-2 mg inositol per gram of lactose;
0.1-2 mg L-carnitine per gram of lactose;
0.01-0.2 mg riboflavin per gram of lactose;

wherein the combined concentration of sodium, potassium, calcium and magnesium is less than 2 mmol per 100 grams of dry matter, more preferably less than 1.5 mmol per 100 grams of dry matter and most preferably less than 1.2 mmol per 100 grams of dry matter.

Preferably, the demineralised lactose concentrate is obtainable, more preferably obtained by the process described herein before.

The demineralised lactose concentrate of the present invention is preferably isolated from bovine milk.

The lactose concentrate of the present invention may be provided in liquid or dry form. In liquid form the lactose concentrate preferably has a dry matter content of 5-65 wt. %, more preferably of 10-30 wt. % and most preferably of 15-25 wt. %.

The demineralised lactose concentrate preferably contains less than 1% by weight of lactose, more preferably less than 0.8% by weight of lactose and most preferably less than 0.5% by weight of lactose of substances having a molecular weight in excess of 400 Da.

The ash content of the demineralised lactose concentrate preferably is less than 1.2 mg ash per gram of lactose, more preferably 0.05-1.0 mg ash per gram of lactose.

The demineralised lactose concentrate of the present invention preferably comprises 0.0-0.2 mg pantothenic acid per gram of lactose, more preferably 0.0-0.08 mg pantothenic acid per gram of lactose and most preferably 0.0-0.05 mg pantothenic acid per gram of lactose.

The lactose content of the demineralised lactose concentrate preferably is in the range of 930-995 mg lactose per gram of dry matter, more preferably in the range of 950-990 mg lactose per gram of dry matter.

The sodium content of the demineralised lactose concentrate preferably is in the range of 0.03-0.3 mg sodium per gram of lactose, more preferably in the range of 0.05-0.3 mg sodium per gram of lactose.

The potassium content of the demineralised lactose concentrate preferably is in the range of 0.03-1 mg potassium per gram of lactose, more preferably in the range of 0.05-0.3 mg potassium per gram of lactose.

The calcium content of the demineralised lactose concentrate preferably is in the range of 0.03-0.5 mg calcium per gram of lactose, more preferably in the range of 0.04-0.3 mg calcium per gram of lactose.

The biotin content of the demineralised lactose concentrate preferably is in the range of 0.02-0.15 μg biotin per gram of lactose, more preferably in the range of 0.03-0.10 μg biotin per gram of lactose.

Preferably, the biotin content of the demineralised lactose concentrate, expressed as μg biotin per gram of lactose, is at least 30% lower, more preferably at least 50% lower and most preferably 70-90% lower compared to the biotin content of the milk from which the demineralised lactose concentrate is isolated.

Preferably, the biotin content of the demineralised lactose concentrate and of the oligosaccharide-enriched biotin-reduced fraction expressed as μg biotin per mg of oligosaccharide is at least 30% lower, more preferably at least 50-70% lower and most preferably at least 70-90% lower than the biotin content of the milk from which the concentrate and fraction are obtained.

Preferably, the oligosaccharide content of the oligosaccharide-enriched biotin-reduced fraction expressed as mg of oligosaccharide per gr of lactose is at least 3 times higher, more preferably 10 times higher and most preferably at least 100 times higher than the oligosaccharide content of the milk from which the fraction is obtained.

The inositol content of the demineralised lactose concentrate preferably is in the range of 0.2-1.5 mg inositol per gram of lactose, more preferably in the range of 0.25-1.2 mg inositol per gram of lactose.

The L-carnitine content of the demineralised lactose concentrate preferably is in the range of 0.15-1.5 mg L-carnitine per gram of lactose, more preferably in the range of 0.2-1.0 mg L-carnitine per gram of lactose.

The riboflavin content of the demineralised lactose concentrate preferably is in the range of 0.01-0.10 mg riboflavin per gram of lactose, more preferably in the range of 0.02-0.08 mg riboflavin per gram of lactose.

As explained above, the demineralised lactose concentrate of the present invention may be subjected to a process step in which lactose is separated from the oligosaccharides contained therein to produce an oligosaccharide-enriched biotin-reduced fraction.

Accordingly, a further aspect of the invention relates to an oligosaccharide-enriched biotin-reduced fraction comprising:

300-900 mg lactose per gram of dry matter;
1-30 mg ash per gram of dry matter;
0.5-75 mg oligosaccharides per gram of dry matter;
5-100 μg biotin per gram of oligosaccharides.

Preferably, the oligosaccharide-enriched biotin-reduced fraction is obtainable, more preferably obtained by the process described herein before.

Preferably, the lactose content of the oligosaccharide-enriched biotin-reduced fraction is in the range of 400-850 mg lactose per gram of dry matter, most preferably 500-800 mg lactose per gram of dry matter.

The ash content of the oligosaccharide-enriched biotin-reduced fraction preferably is in the range of 3-20 mg ash per gram of dry matter, more preferably in the range of 4-12 mg ash per gram of dry matter.

The oligosaccharides content of the oligosaccharide-enriched biotin-reduced fraction preferably is in the range of 1-60 mg oligosaccharides per gram of dry matter, more preferably in the range of 2-50 mg oligosaccharides per gram of dry matter, even more preferably in the range of 4-40 mg oligosaccharides per gram of dry matter, most preferably in the range of 6-35 mg oligosaccharides per gram of dry matter.

Oligosaccharides containing 3-6 monosaccharide units preferably represent at least 50 wt. %, more preferably 70-99 wt. % and most preferably 80-98 wt. % of the oligosaccharides present in the oligosaccharide-enriched biotin-reduced fraction.

According to a further preferred embodiment, the oligosaccharide-enriched biotin-reduced fraction contains 0.02-0.6 μg biotin per gram of dry matter, more preferably 0.04-0.4 μg biotin per gram of gram of dry matter.

The oligosaccharide-enriched biotin-reduced fraction preferably contains 5-400 mg oligosaccharides per gram of lactose, more preferably 10-200 mg oligosaccharides per gram of lactose, even more preferably 15-100 mg oligosaccharides per gram of lactose and most preferably 20-80 mg oligosaccharides per gram of lactose.

The oligosaccharide-enriched biotin-reduced fraction preferably contains 8-90 μg biotin per gram of oligosaccharides, more preferably 10-80 μg biotin per gram of oligosaccharides, most preferably 15-60 μg biotin per gram of oligosaccharides.

The oligosaccharide-enriched biotin-reduced fraction is preferably isolated from bovine milk.

Yet another aspect of the invention relates to a method of preparing an edible product or a pharmaceutical product, the method comprising combining the biotin-reduced lactose isolate, or the oligosaccharide-enriched, biotin-reduced fraction of the present invention with one or more other edible ingredients. Examples of edible products that may suitably be prepared using the biotin-reduced lactose isolate or the oligosaccharide-enriched, biotin-reduced fraction include nutritional formulations and food products.

According to a particularly preferred embodiment, the edible product is selected from infant formula, toddler nutrition and clinical nutrition. Most preferably the edible product is infant formula.

In the present method, the demineralised lactose concentrate is preferably combined with the one or more other edible ingredients to provide 200-800 grams of lactose per kg of the dry matter present in the nutritional product, more preferably 300-750 grams of lactose per kg of the dry matter present in the nutritional product and most preferably 500-700 grams of lactose per kg of the dry matter present in the nutritional product.

In the present method, the oligosaccharide-enriched, biotin-reduced fraction is preferably combined with the one or more other edible ingredients to provide 100-10,000 mg of oligosaccharides per kg of the dry matter present in the nutritional product, more preferably 1,000-7,000 mg of oligosaccharides per kg of the dry matter present in the nutritional product and most preferably 2,000-5,000 mg of oligosaccharides per kg of the dry matter present in the nutritional product.

The invention is further illustrated by the following non-limiting examples.

EXAMPLES

Methodologies

The calcium, sodium, potassium, and magnesium content was determined via atomic absorption spectrometric method (ISO 8070/IDF 119).

The phosphorus content was determined via molecular absorption spectrometry (ISO 9874/IDF 42).

The protein content (N*6.25) was determined with FT001/IDF 20-3.

Example 1

Preparation of Demineralised Lactose Concentrate

Pasteurized raw bovine milk (Dairygold, Mitchelstown, Cork, Ireland) was subjected to centrifugal separation (skimming) at 50° C. for fat removal. 2000 kg of the skimmed milk so obtained was then subjected to ultrafiltration (UF), using a Model F pilot filtration plant (GEA), equipped with spiral wound polymer membranes (Koch, type 3838 VYV 46 mil) having a molecular weight cut off (MWCO) of 10 kDa. The UF process was carried out at 10° C., resulting in a retentate volume of 500 kg and 1500 kg permeate (UFP).

The UFP was subjected to nanofiltration (NF), using a Model F pilot filtration plant (GEA), equipped with 2 spiral wound polymer membranes (Suez, type DK3838C30, 7.4 m$^2$ per membrane) which is guaranteed to have a minimum rejection of 98% on 2,000 ppm MgSO$_4$ at 25° C. (77° F.) and 110 psi operating pressure. The NF process was carried out at 10° C., 28 bar feed pressure via batch concentration to increase the solids content to above 23%, resulting in 300 kg of retentate (NFR) and 1200 kg permeate (NFP).

35 kg of the NFR was subjected to electrodialysis (ED) via Mega Membrain P1 EDR-Y/50 PLC electrodialysis unit with a maximum feed tank capacity of 100 kg. ED was carried out in batch mode with temperature controlled between 10-20° C. A maximum voltage of 50 V was applied resulting in a total current across the membrane stack decreasing from an initial current of 4.6 A. ED continued until the conductivity of the diluate registered 0.1 mS/cm. The composition of the NFR and the ED diluate are outlined in Table 1.

TABLE 1

| Parameter | Detection limit | Unit | NF Retentate | ED diluate |
|---|---|---|---|---|
| Ash content | 0.01 | g/100 g | 1.14 | 0.01 |
| Dry matter (DM) | | g/100 g | 25.1 | 21.6 |
| Nitrogen (Kjeldahl) | 0.0016 | g/100 g | 0.062 | 0.037 |

TABLE 1-continued

| Parameter | Detection limit | Unit | NF Retentate | ED diluate |
|---|---|---|---|---|
| Protein (N × 6.25) | 0.01 | g/100 g | 0.39 | 0.23 |
| Fat | 0.1 | g/100 g | <0.1* | 0.49 |
| Carbohydrate calculated (difference) | 0.1 | g/100 g | 23.2 | 20 |
| Lactose | 0.2 | g/100 g | 23.6 | 20.9 |
| Sum of mono- and disaccharides | | g/100 g | 23.6 | 20.9 |
| Sodium (Na) | 1 | mg/100 g | 63.3 | 1.8 |
| Potassium (K) | 1 | mg/100 g | 219.6 | 1.4 |
| Calcium (Ca) | 1 | mg/100 g | 148.6 | 1.7 |
| Phosphorus | 5 | mg/100 g | 125 | 17 |
| Chloride (Cl) | 10 | mg/100 g | 59 | <10* |
| Biotin | 1 | µg/100 g | 5.7 | 1.7 |
| Inositol | 3 | mg/100 g | 9.8 | 9.9 |
| Riboflavin | 1 | mg/100 g | 0.856 | 0.77 |
| Carnitine | 0.1 | mg/100 g | 10.30 | 9.29 |
| Pantothenic Acid | 0.04 | mg/100 g | 1.62 | 0.32 |
| RATIOS | | | | |
| Lactose/DM(sum) | | g/100 g DM | 936 | 966 |
| Ash/Lactose | | mg/g lactose | 48.3 | 0.48 |
| K/Lactose | | mg/g lactose | 9.31 | 0.07 |
| Na/Lactose | | mg/g lactose | 2.68 | 0.09 |
| Ca/Lactose | | mg/g lactose | 6.30 | 0.08 |
| Cl/Lactose | | mg/g lactose | 2.50 | <0.48* |
| Biotin/Lactose | | µg/g lactose | 0.24 | 0.08 |
| Inositol/Lactose | | mg/g lactose | 0.42 | 0.47 |
| Riboflavin/Lactose | | mg/g lactose | 0.04 | 0.04 |
| Carnitine/Lactose | | mg/g lactose | 0.44 | 0.44 |
| Pantothenic Acid/Lactose | | mg/g lactose | 0.007 | 0.002 |

* Limit of Quantification

These same results are graphically represented in FIG. 2.

These results show that the ED treatment reduced the mineral content, the biotin content and the pantothenic acid content of the NF retentate. The results also show that the ED treatment had virtually no effect on the concentration levels of inositol, riboflavin and carnitine.

Example 2

Isolation of an Oligosaccharide-Enriched Biotin-Reduced Fraction

In order to concentrate the isolate an oligosaccharide-enriched biotin-reduced fraction, the biotin-reduced lactose isolate of Example 1 is subjected to a lactose crystallization step. Crystallisation is induced by removing water via evaporation at 70° C. until a concentrate of 65% DM is obtained. Next, the concentrate is cooled to 20° C. overnight in an agitated double jacketed tank forcing the lactose to crystalize. Subsequently the lactose crystals are separated from the mother liquor via a centrifugal separator and dried in a fluidized bed drier.

The composition of the biotin-reduced lactose isolate and of the oligosaccharide fraction (mother liquor) are shown in Table 2

TABLE 2

| | Unit | Biotin-reduced lactose isolate | Oligosaccharide enriched biotin-reduced fraction |
|---|---|---|---|
| Lactose | g/100 g dry matter | 97 | 90 |
| Ash | g/100 g dry matter | 0.0 | 0.1 |
| Biotin | µg/100 g dry matter | 8 | 23 |
| Oligosaccharides | mg/100 g dry matter | 204 | 593 |
| Oligosaccharides:lactose (w/w) | | 2.1 mg/g | 6.6 mg/g |

15
16

Example 3

Isolation of a Fraction Having a High Oligosaccharide Content

In order to produce an isolate having a high oligosaccharide content, the mother liquor that is obtained from the crystallisation step of Example 2 is subjected to another crystallisation step. This procedure is repeated two more times.

The composition of the mother liquor obtained after the third crystallisation step is shown in Table 3.

TABLE 3

|  | Unit | Oligosaccharide enriched biotin-reduced fraction |
| --- | --- | --- |
| Lactose | g/100 g of dry matter | 55 |
| Ash | g/100 g dry matter | 0.6 |
| Biotin | μg/100 g of dry matter | 100 |
| Oligosaccharides | mg/100 g of dry matter | 2600 |
| Oligosaccharides:lactose (w/w) |  | 47 mg/g |

If the evaporation/crystallisation cycle is repeated two more times, the mother liquor obtained from the final crystallisation step has the composition that is shown in Table 4.

TABLE 4

|  | Unit | Oligosaccharide enriched biotin-reduced fraction |
| --- | --- | --- |
| Lactose | g/100 g of dry matter | 34 |
| Ash | g/100 g dry matter | 0.9 |
| Biotin | μg/100 g of dry matter | 145 |
| Oligosaccharides | mg/100 g of dry matter | 3800 |
| Oligosaccharides:lactose (w/w) |  | 110 mg/g |

The invention claimed is:

1. A process of producing a biotin-reduced lactose isolate, said process comprising:
providing a partially demineralised aqueous lactose isolate having a lactose content of 5-40 wt. %, a water content of at least 40 wt. %, lactose content of at least 90% by weight of dry matter, and an ash content of at least 10 mg ash per gram of lactose, wherein the lactose and water together constitute at least 80 wt. % of the isolate, said isolate containing:
1-30 mg sodium per gram of lactose;
5-50 mg potassium per gram of lactose;
1-40 mg chloride per gram of lactose;
0.15-3 μg biotin per gram of lactose;
wherein the partially demineralised lactose isolate is prepared by:
subjecting an optionally microfiltered dairy liquid to an ultrafiltration step using an ultrafiltration membrane with a cut-off in the range of 3-100 kDa to produce a ultrafiltration permeate, said dairy liquid being selected from skim milk, whey, whole milk and combinations thereof;
subjecting the ultrafiltration permeate to a nanofiltration or reverse osmosis step to produce a nanofiltration or reverse osmosis retentate, said nanofiltration or reverse osmosis step employing a nanofiltration or reverse osmosis membrane having a cut-off in the range of 35-2000 Da; and optionally subjecting the nanofiltration or reverse osmosis retentate to a softening step, said softening step comprising adding a sequestering agent to the nanofiltration or reverse osmosis retentate, said sequestering agent being selected from phosphates, polyphosphates, phosphonates, polycarboxylates and combinations thereof;
subjecting the partially demineralised aqueous lactose isolate to a electrodialysis (ED) step using a voltage in the range of 30 to 200 V to produce a biotin-reduced lactose isolate having a conductivity below 0.5 mS/cm and containing at least 90% lactose by weight of dry matter and less than 2 mg ash per gram of lactose, and containing:
0.02-1.5 mg sodium per gram of lactose;
0.02-2 mg potassium per gram of lactose;
0.05-1.5 mg chloride per gram of lactose;
0.01-0.25 μg biotin per gram of lactose.
2. The process according to claim 1, wherein the ED step is carried out using a voltage in the range of 30 to 100 V.
3. The process according to claim 1, wherein the total electrical energy input during the ED step equals 20-200 Joule per gram of lactose.
4. The process according to claim 1, wherein the conductivity of the biotin-reduced lactose isolate is below 0.3 mS/cm.
5. The process according to claim 1, wherein the biotin-reduced lactose isolate has a conductivity that is at least 5 times lower than the conductivity of the partially demineralized aqueous lactose isolate.
6. The process according to claim 1, wherein the biotin content of the biotin-reduced lactose isolate, calculated by weight of lactose, is at least 50% lower than the biotin content of the partially demineralised lactose isolate, calculated by weight of lactose.
7. The process according to claim 1, wherein the partially demineralised aqueous lactose isolate has a whey protein content that does not exceed 3% by weight of dry matter.
8. The process according to claim 1, wherein the partially demineralised aqueous lactose isolate has a lactose content of at least 90% by weight of dry matter.
9. The process according to claim 1, wherein the ultrafiltration step employs an ultrafiltration membrane having a cut-off in the range of 5-20 kDa.

10. The process according to claim 1, wherein the nano-filtration or reverse osmosis step employs a nanofiltration or reverse osmosis membrane having a cut-off in the range of 500-2000 Da.

11. The process according to claim 1, wherein the biotin-reduced lactose isolate is subjected to one or more crystal-lisation steps to produce crystallised lactose and an oligo-saccharide-enriched biotin-reduced fraction.

\* \* \* \* \*

18